United States Patent
Ro

(10) Patent No.: US 8,403,295 B1
(45) Date of Patent: Mar. 26, 2013

(54) ELECTROMAGNETIC WATER SUPPLY VALVE

(75) Inventor: Gwan Ho Ro, Seoul (KR)

(73) Assignee: Useong Electro Mechanics Co., Ltd., Gyeonggi-Do (KR)

( * ) Notice: Subject to any disclaimer, the term of this patent is extended or adjusted under 35 U.S.C. 154(b) by 13 days.

(21) Appl. No.: 13/299,923

(22) Filed: Nov. 18, 2011

(30) Foreign Application Priority Data

Oct. 5, 2011 (KR) .................. 10-2011-0101092

(51) Int. Cl.
*F16K 31/02* (2006.01)
(52) U.S. Cl. .................. 251/129.15; 251/148
(58) Field of Classification Search .................. 251/142, 251/148, 152, 129.01, 129.15
See application file for complete search history.

(56) References Cited

U.S. PATENT DOCUMENTS

| | | | | |
|---|---|---|---|---|
| 3,195,561 A | * | 7/1965 | Sovitzky | 137/315.03 |
| 5,154,394 A | * | 10/1992 | DuHack | 251/129.15 |
| 5,620,019 A | * | 4/1997 | Nicolaisen | 251/129.15 |
| 6,070,606 A | * | 6/2000 | Swanson et al. | 251/148 |
| 6,357,721 B1 | * | 3/2002 | Maurer | 251/148 |
| 6,422,258 B1 | * | 7/2002 | DuHack et al. | 137/315.03 |
| 6,615,858 B2 | * | 9/2003 | DuHack et al. | 251/129.15 |
| 7,222,642 B2 | * | 5/2007 | DuHack et al. | 251/118 |

* cited by examiner

*Primary Examiner* — John Bastianelli
(74) *Attorney, Agent, or Firm* — Dykema Gossett PLLC

(57) ABSTRACT

An electromagnetic valve. A body includes a valve chest disposed between an inlet and an outlet. A valve seat is opened and closed by a movable core. A lock ring is fitted into the inlet. A finishing member closes the outer end of the inlet, and in cooperation with the stator, forcibly fixes the lock ring and guides the tube to be inserted. A chamber is defined by an extension of the finishing member in the direction away from the inlet. A latch element adjacent to the lock ring limits the deformation of the lock ring in response to changes in the pressure of water. A support element protrudes from the outer circumference of the tube to support the rear end of the latch element. The locking ring is prevented from being deformed, so that the coupling of the tube becomes more structurally stable and secure.

3 Claims, 3 Drawing Sheets

(a)  (b)

ELECTROMAGNETIC WATER SUPPLY VALVE

CROSS REFERENCE TO RELATED APPLICATION

The present application claims priority from Korean Patent Application Number 10-2011-101092 filed on Oct. 5, 2011, the entire contents of which application are incorporated herein for all purposes by this reference.

BACKGROUND OF THE INVENTION

1. Field of the Invention

The present invention relates to an electromagnetic water supply valve that controls the supply of water and, more particularly, to an electromagnetic water supply valve that has a structure for preventing a tube from being detached, which is connected to an inlet and an outlet for water.

2. Description of Related Art

Various types of electromagnetic valves, which control the supply of water in refrigerators, have been developed and used to the present. Such an electromagnetic valve has an inlet in one portion of the body thereof through which water supplied from the water supply pipe flows in and an outlet in another portion of the body through which the water flows out to the user side. A valve chest is disposed between the inlet and the outlet, and a valve seat is provided in the valve chest. The valve seat is opened and closed by a valve plate that is driven by a movable core, which is actuated by a magnetic force from an electromagnet.

Here, tubes are essentially connected to the inlet side or the outlet side of the electromagnetic valve in order to provide pipelines through which water flows in or is supplied to the user side. The tubes are fitted into the inlet/outlet side. The tubes, which are coupled to the inlet/outlet side of the body of the electromagnetic valve, are required to have coupling force, which facilitates insertion and detachment, keeps the watertight state, and prevents detachment in response to a change in the pressure of water.

Accordingly, coupling structures have been developed and used, which facilitate the insertion and detachment of the tubes, keep the tubes in the watertight state, and prevent the tubes from being detached in response to a change in the pressure of water. As an example thereof, a lock ring and a finishing member are sequentially disposed in the inlet/outlet side. The lock ring is disposed in the inlet/outlet side such that it allows a stator and a tube to be inserted in one direction. The finishing member closes the outer end of the inlet/outlet side and, in cooperation with the stator, forcibly fixes the lock ring and guides the insertion of the tube. A mover is inserted into the inlet/outlet side such that it can move inwards and outwards through the finishing member, so that the lock ring, which has been coupled with the tube, can be released from the tube with one push. Consequently, the tube can be easily detached.

Such a coupling structure, which facilitates the attachment and detachment of the tube, has made it easy to replace or repair parts. However, the tube is frequently detached from the valve, since the coupled state of the tube is not stable.

In addition, the above-described coupling structure for the tube depends on the lock ring. The lock ring is made of an elastic plate having a substantially annular shape by cutting it in the radial direction from the inner circumference to the outer circumference, and then rolling it. The lock ring has a conical shape such that an entrance through which the tube is inserted is wider and an exit is gradually narrowed. Consequently, the exit side contracts and expands in response to the detachment and insertion of the tube so that the lock ring is coupled with the tube.

The lock ring, which contracts and expands in this fashion, has a certain modulus of elasticity so that it can flexibly contract and expand in response to the detachment and attachment of the tube. Here, the modulus of elasticity of the lock ring is not greater than the abnormal pressure of supply water. When an excessive pressure that is above a normal pressure occurs in the pipeline, the lock ring tends to be deformed by the abnormal pressure of water, so that the coupling force of the tube is decreased.

As such, the coupling structure using the lock ring fails to properly cope with irregular changes in the pressure of supply water inside the pipeline. Since the coupled structure of the tube is not stable, water leaks, and the tube is frequently detached from the inlet/outlet side, thereby decreasing the reliability of the product.

Recently, the coupling structure aimed at the convenient detachment of the tube as above has been considered unreliable because of its instability. Therefore, a novel fixing method that can more securely maintain the installation state of the tube is demanded.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an electromagnetic valve in which, in addition to a structure that couples a tube using a lock ring, a latch element which prevents the lock ring from being deformed under the pressure of water is provided, so that the lock ring can be stably coupled with the tube without a change in the coupled state even under a high water pressure.

Also provided is an electromagnetic valve in which a fitting protrusion structure which is designed to catch a tube is provided by improving the structure of a finishing element of a water inlet and the structure of the tube, such that the fitting protrusion structure, in cooperation with the lock ring, enables the tube to be coupled additionally, so that the tube stays in the installation state more securely, thereby increasing the reliability of the product.

In an aspect of the present invention, the electromagnetic valve includes a body, which includes an inlet in a portion thereof, an outlet in another portion thereof, a valve chest disposed between the inlet and the outlet of the body, a valve seat of the valve chest, the valve seat being opened and closed by a movable core, which is actuated by an electromagnet, and a lock ring fitted into the inlet of the body, the lock ring allowing a stator and a tube to be inserted in one direction. The electromagnetic valve also includes a finishing member, which closes the outer end of the inlet, and in cooperation with the stator, forcibly fixes the lock ring and guides the tube to be inserted. A chamber is defined by an extension of the finishing member in the direction away from the inlet. A latch element is disposed adjacent to the lock ring around the lock ring inside the chamber, and limits the deformation of the lock ring in response to changes in the pressure of water. A support element protrudes from the outer circumference of the tube. The support element supports the rear end of the latch element. The locking ring is prevented from being deformed by the changes in the pressure of water, so that the coupling of the tube becomes more structurally stable and secure.

According to embodiments of the present invention, the electromagnetic valve has, in addition to the structure that couples the tube using the lock ring, the latch element which prevents the lock ring from being deformed under the pressure of water, so that the lock ring can be stably coupled with the tube without a change in the coupled state even under a high water pressure.

According to embodiments of the present invention, the fitting protrusion structure which is designed to catch the tube is provided by improving the structure of the finishing element of the water inlet and the structure of the tube, such that the fitting protrusion structure, in cooperation with the lock ring, enables the tube to be coupled additionally, so that the tube stays in the installation state more securely, thereby increasing the reliability of the product.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

BRIEF DESCRIPTION OF THE DRAWINGS

FIG. 2A and FIG. 2B are enlarged cross-sectional view showing the tube-coupling structure as a major part of the electromagnetic valve shown in FIG. 1, wherein FIG. 2A shows the state before the tube is assembled, and FIG. 2B shows the state after the tube is assembled.

DETAILED DESCRIPTION OF THE INVENTION

Reference will now be made in detail to various embodiments of the present invention, examples of which are illustrated in the accompanying drawings and described below. While the invention will be described in conjunction with exemplary embodiments thereof, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Figure 1:
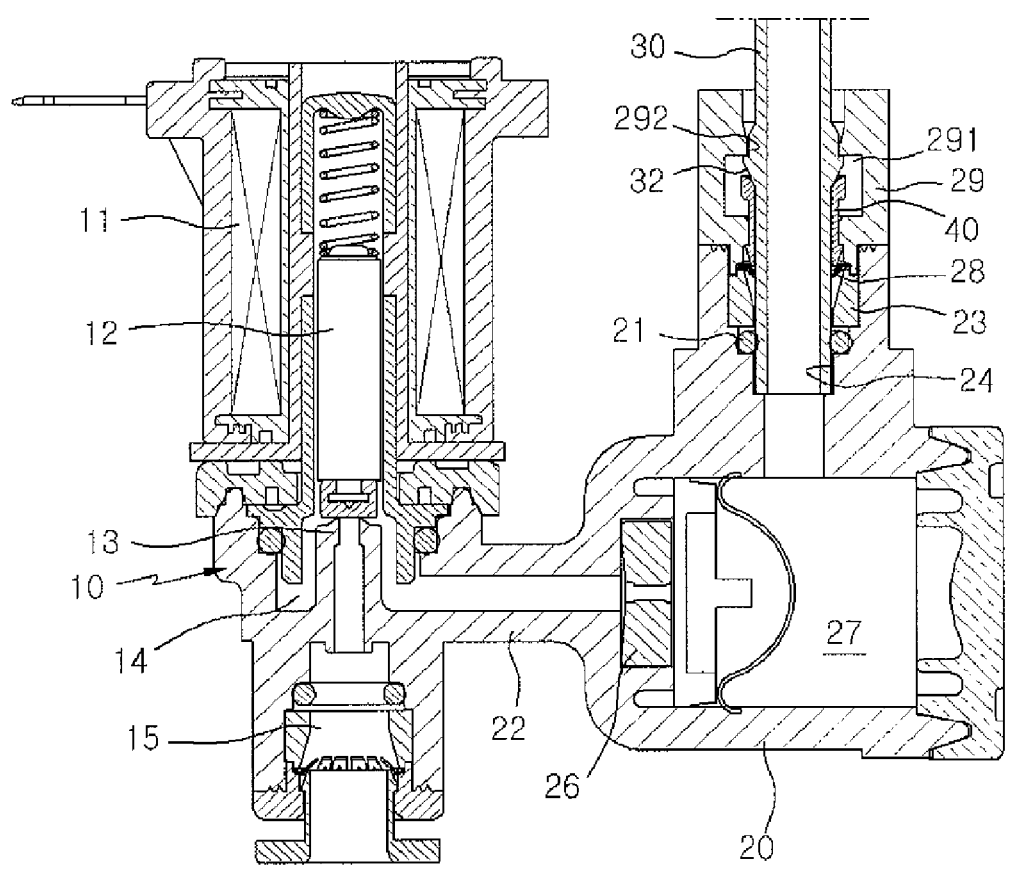
FIG. 1 is a cross-sectional view showing the entire structure of an electromagnetic valve according to an embodiment of the present invention.

An electromagnetic valve according to an embodiment of the present invention is shown in detail in FIG. 1.

The present invention provides an example of the electromagnetic valve that controls the supply of water to a refrigerator. The electromagnetic valve selectively controls the supply of water so that the water can be supplied at a constant rate to a dispenser and an ice machine, respectively.

The electromagnetic valve generally includes a body 10 and a constant-flow regulator 20. First, the body 10 includes a valve chest 14 having a valve seat 13, which is opened and closed by a movable core 12, which is actuated by an electromagnet 11. An outlet 15 is provided on the lower portion of the valve chest 14, such that tubes, which are subsequently connected to the dispenser and the ice machine, are fitted into the outlet 15.

The constant-flow regulator 20 has defined a connector tube 22 in a portion thereof, which is connected to the valve chest 14 of the body 10, and an inlet 24 in another portion thereof. A tube 30, which is directly connected to a water supply pipeline, is connected to the inlet 24 such that it introduces water from the water supply pipeline. A chamber 27 has an inner space with a predetermined width. The chamber 27 temporarily contains water that flows in through the inlet 24 to decrease the pressure of supply water (head pressure), and allows the water to flow out at a constant rate using a flow-control seat 26.

A sealing element 21, a stator 23 and a lock ring 28 are fitted into the inlet 24, such that they are sequentially arranged from the inner end of the inlet 24. The lock ring 28 expands and contracts so that the tube 30 can be inserted in one direction through the lock ring 28. A finishing member 29 closes the outer end of the inlet 24, and cooperates with the stator 23 to guide the fixing of the lock ring 28 under pressure and the insertion of the tube 30.

The foregoing features of the electromagnetic valve are the same as those of the related art, but the key concept of the present invention is the improvement of a fastening structure that enables the tube 30, which is inserted into and connected to the inlet 24, to securely stay in the coupled state without being detached even if the pressure of water is abnormal.

In this embodiment, the finishing member 29 extends away from the inlet 24, with a hollow chamber 291 being defined therein.

A latch element 40 is disposed inside the chamber 291 such that it is positioned around the tube 30 and adjacent to the lock ring 28. The latch element 40 acts in response to the expansion of the lock ring 28, so that the deformation of the lock ring 28 in response to a change in the pressure of water is limited.

In addition, a support element 32 protrudes from the outer circumference of the tube 30, spaced apart a predetermined distance from the inner end of the tube 30. The support element 32 supports the rear end of the latch element 40. Here, the support element 32 has a conical cross section on the outer circumference of the tube 30.

As above, the support member 40 does not slip since its rear end is supported on the support element 32, and the lock ring 28, which holds the tube 30, is supported by the support member 40. This structure improves resistance against the pressure of water, so that the tube 30 can remain more securely and stably in the coupled state.

In addition, the chamber 291 of the finishing member 29 has a fitting protrusion 292. The fitting protrusion 292 supports the rear end of the support element 32 of the tube 30, and cooperates with the lock ring 28 so that the tube 30 can be more securely coupled.

Figure 2:
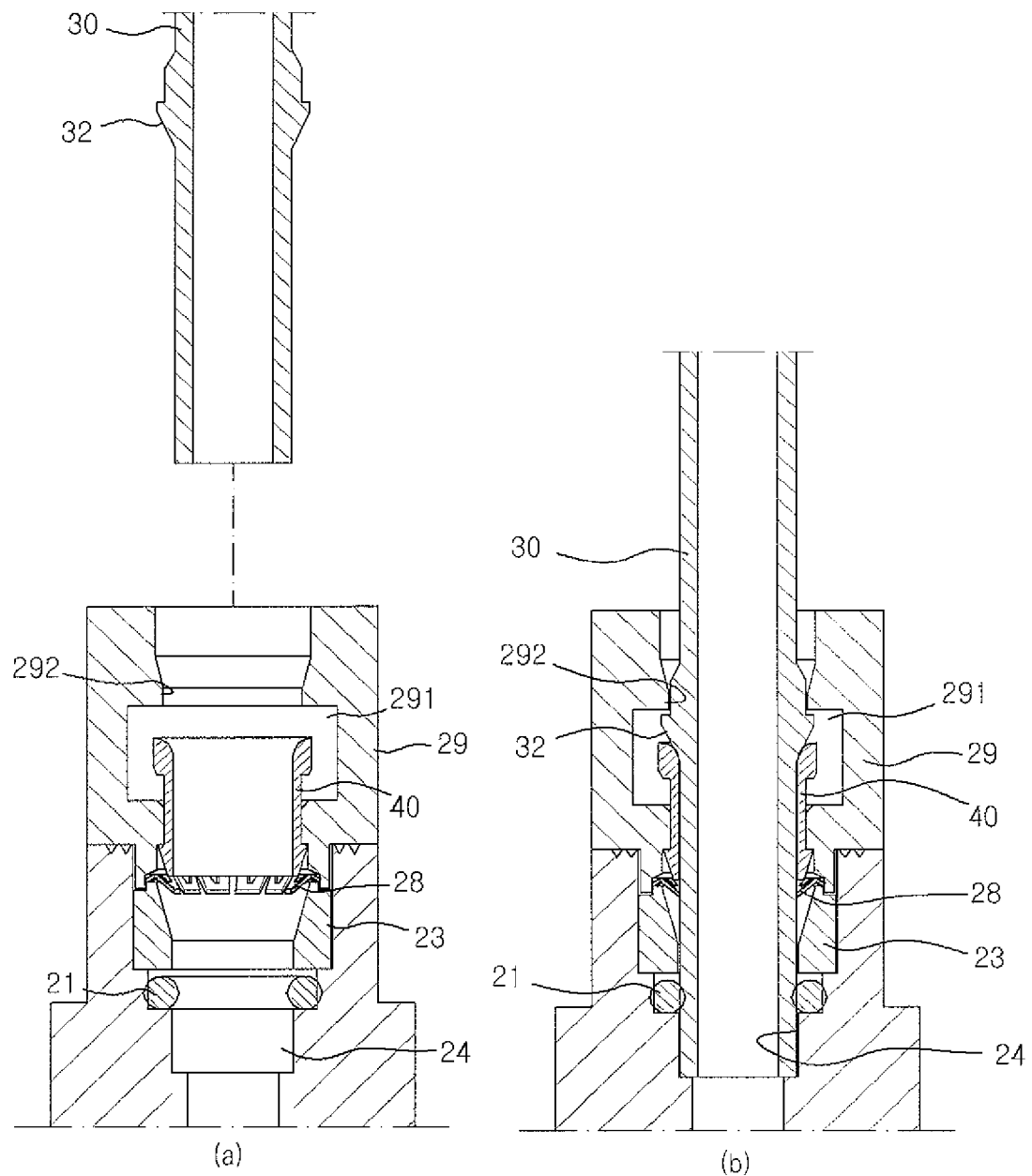

FIG. 2A and FIG. 2B show the states before and after the tube 30 is fitted into the electromagnetic valve of this embodiment.

FIG. 2A shows the state before the tube 30 is fitted into the inlet 24 of the electromagnetic valve of this embodiment or the state in which the tube 30 is detached from the inlet 24.

FIG. 2B shows the state in which the tube 30 is completed fitted into the inlet 24 of the electromagnetic valve of this embodiment. The tube 30 is forcibly pushed into the inlet 24 through the finishing member 29. When the inner end of the tube 30 is brought into contact with a stepped portion in the inner end of the inlet 24, the process of inserting the tube 30 is completed. At the same time, the rear portion of the lock ring 28 is supported by the latch element 40, and the rear end of the latch element 40 is sequentially supported by the support element 32 of the tube 30. The rear end of the support element 32 of the tube 30 is supported again and finally by the fitting protrusion 292 of the finishing member 29.

Figure 3:
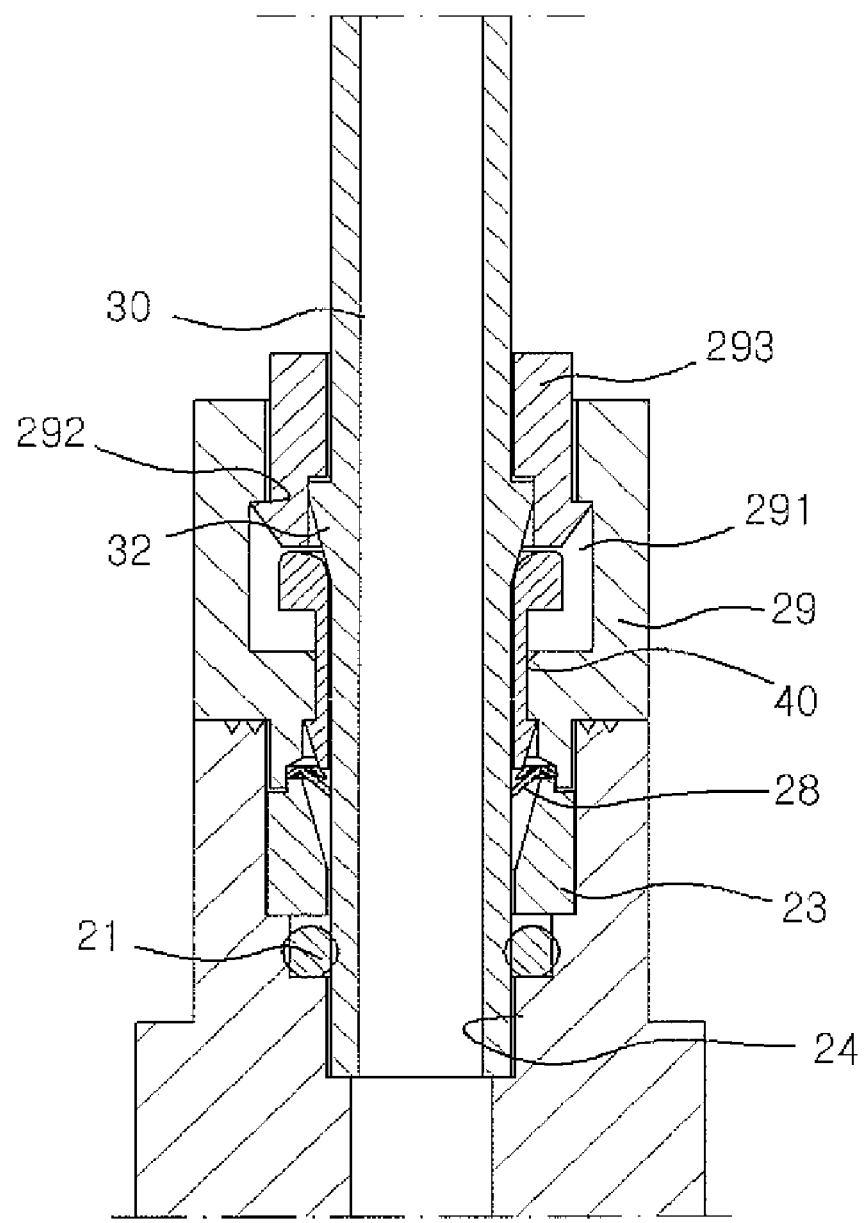
FIG. 3 is a cross-sectional view showing an electromagnetic valve according to another embodiment of the present invention.

FIG. 3 shows an electromagnetic valve according to another embodiment of the present invention. This embodiment is the same as the foregoing embodiment except that an auxiliary finishing member 293 is interposed between the finishing member 29 and the tube 30. The auxiliary finishing member 293 supports the support element 32 of the tube 30 while supporting the rear end of the latch element 40.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromagnetic valve comprising:
 a body, wherein the body comprises:
  an inlet in a portion thereof;
  an outlet in another portion thereof; and
  a valve chest disposed between the inlet and the outlet of the body;
  a valve seat of the valve chest, wherein the valve seat is opened and closed by a movable core, which is actuated by an electromagnet;
 a lock ring fitted into the inlet of the body, the lock ring allowing a stator and a tube to be inserted in one direction;
 a finishing member, wherein the finishing member closes an outer end of the inlet, and in cooperation with the stator, forcibly fixes the lock ring and guides the tube to be inserted;
 a chamber defined by an extension of the finishing member in a direction away from the inlet;
 a latch element disposed adjacent to the lock ring around the lock ring inside the chamber, the latch element limiting a deformation of the lock ring in response to changes in pressure of water; and
 a support element protruding from an outer circumference of the tube, the support element supporting a rear end of the latch element.

2. The electromagnetic valve of claim 1, further comprising a fitting protrusion formed on the chamber of the finishing member, wherein the fitting protrusion supports the support element of the tube and, in cooperation with the lock ring, enables the tube to be coupled additionally.

3. The electromagnetic valve of claim 1, further comprising an auxiliary finishing member disposed between the finishing member and the tube, wherein the auxiliary finishing member supports the support element of the tube and supports a rear end of the latch element.

\* \* \* \* \*